Patented Jan. 26, 1932

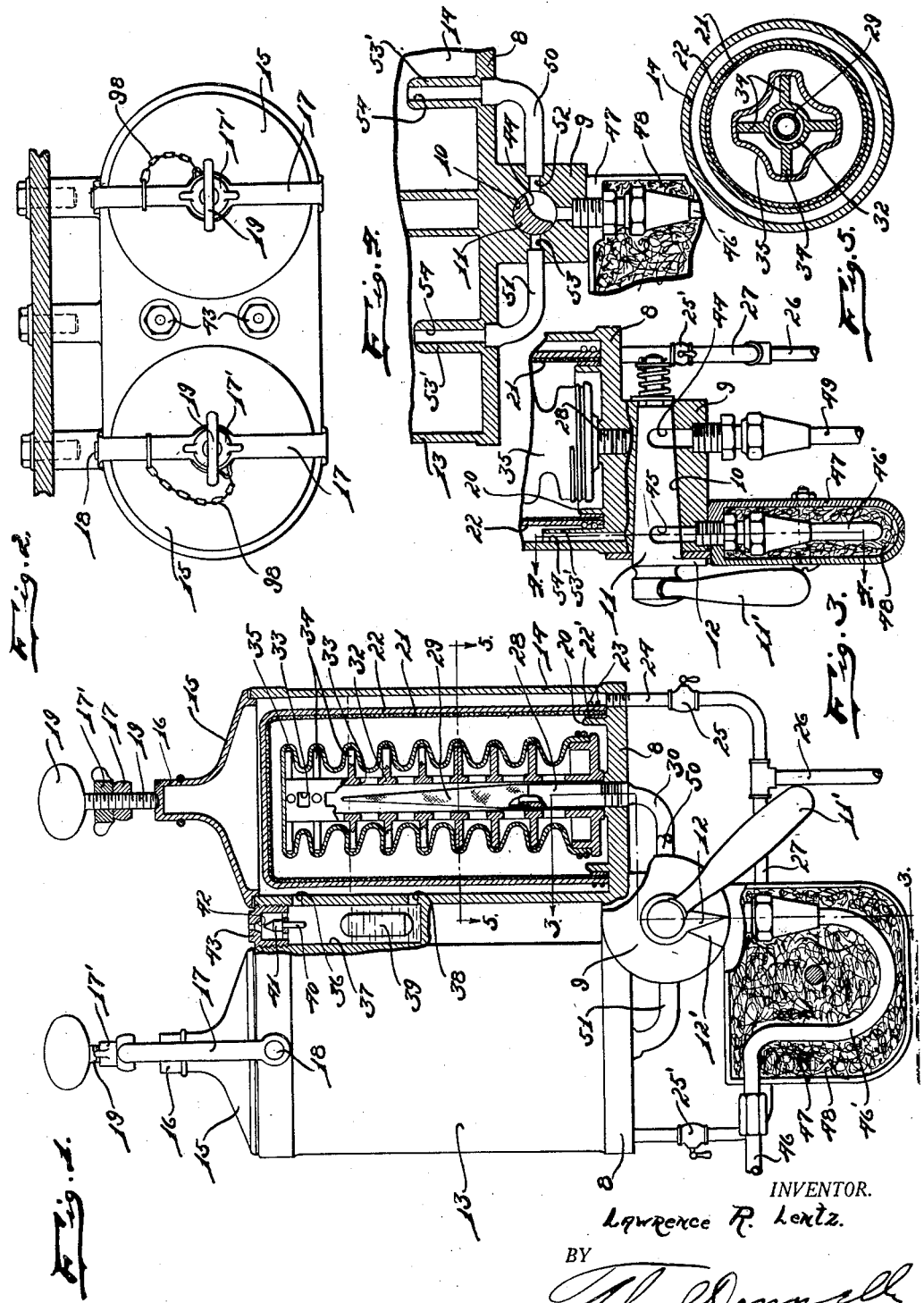

1,842,990

UNITED STATES PATENT OFFICE

LAWRENCE R. LENTZ, OF WINDSOR, CANADA

FILTER

Application filed January 14, 1929. Serial No. 332,291.

My invention relates to a new and useful improvement in a filter adapted for use particularly in filtering gasoline used on vehicles such as aeroplanes, automobiles and the like, although from the description it will appear evident that the filter may be used for filtering other articles such as quick silver and the like.

It is an object of the present invention to provide a filter of this class which will be simple in structure, economical of manufacture and highly efficient in use.

Another object of the invention is the provision of a filter having a filtering member which may be easily and quickly removed and replaced, while the engine is running.

Another object of the invention is the provision of a filter having an air vent and automatic control for preventing overflow.

Another object of the invention is the provision in a filter of this class of a filtering medium having a maximum area exposed to the material to be filtered so as to facilitate the filtering thereof.

Other objects will appear hereinafter.

The invention consists in the combination and arrangement of parts hereinafter described and claimed.

The invention will be best understood from a reference to the accompanying drawings which form a part of this specification, and in which, Fig. 1 is a side elevational view of the invention with a part shown in section.

Fig. 2 is a top plan view of the invention.

Fig. 3 is a fragmentary sectional view taken on line 3—3 of Fig. 1.

Fig. 4 is a fragmentary sectional view taken on line 4—4 of Fig. 3.

Fig. 5 is a sectional view taken on line 5—5 of Fig. 1 with parts eliminated.

As shown in the drawings, the invention comprises a base 8 which is formed preferably integral with the plug 9 provided with the bore 10 formed therein to accommodate the conical valve plug 11 on which is mounted the operating handle 11'. A pointer 12 is mounted on the plug 11 and rotatable therewith and adapted to engage the boss 12' on the plug 9 so as to limit the rotation of the plug 11. Projecting upwardly from the base 8 is a cylindrical container 14, which is connected to a similar cylindrical container 13, these containers being formed integral with the base. The construction and operation of these containers is the same so that a description of one will suffice for both. The container is provided with a cover 15 projecting upwardly from which is the neck 16. Swingably mounted on a trunnion 18, projecting outwardly from the container 13 is a yoke 17 through which is projected a screw 19, this screw being provided with a lock nut 17' so that the cover 15 may be securely clamped in position on the container 13. A chain 98 connects to the neck 16 and to the yoke 17 so that there is always a connection between the cover 15 and the container 13, thus grounding the container and the cover at all times and preventing any possibility of sparking as the cover is brought close to a closing position.

Projecting upwardly from the base 8, interiorly of the container 14 is a circular flange 20. Embracing the flange 20 is a screen 21, the gasket 22' being positioned between the flange 20 and the screen 21. This screen 21 serves as a support for a covering 22 formed from sheep skin or buck skin, wires 23 serving to clamp the sheep skin covering 22 and the supporting screen 21 in position on the gasket 22', the gasket being held in place on the flange 20 by friction. Communicating with the interior of the container 14 between the wall thereof and the sheep skin 22 is a drain pipe 24 having a control valve 25 mounted therein, this drain pipe communicating with the drain delivery pipe 26. This drain delivery pipe 26 is also connected through the pipe 27 to the interior of the container 13, a suitable valve 25' being interposed between the pipe 26 and the container 13.

Threaded into the base 8 is a pipe 28 on which is mounted a conical screen 29, this pipe 28 communicating with an outlet pipe 30 which leads into the plug or housing 9. A similar outlet pipe leads from the container 13 to the plug or housing 9. Embracing the pipe 28 is a tubular supporting member 32 having a plurality of openings 33 formed therein and provided with outwardly projecting arms 34. This member is held in position by the frictional connection on the pipe 28. Covering the member 32 is a cover 35 of sheep skin or the like, this cover being inwardly pressed between the arms 34 so as to present a maximum area to the liquid which may filter through the covering 22 and the screen 21. The liquid filtering through the cover 35 will enter the supporting member 32 through the opening 33 and thence pass through the screen 29, into the tube 28, and then to the engine through the pipe 30. Communicating with the interior of the chamber 14, is an opening 36 which communicates with the compartment 37, this compartment being also in communication through the opening 38 with the container 14 so that liquid rising in the container 14 will establish its level in the compartment 37. Positioned in this compartment 37 is a float 39 which, when rising to a pre-determined height, will engage the stem 40 and force the valve head 41 to engage the valve seat 42 which is formed in the plug 43, this plug 43 communicating with the atmosphere. In this there is afforded means of air escape or air vent so that a free flowing of the liquid to and from the container 14 under normal conditions is possible. The liquid flowing through the pipe 30 is conducted to the valve plug 11 which is provided with grooves 44 and 45. The groove 45 is adapted to register with the inlet delivery pipe 46 which communicates with the plug or housing 9 and which is provided with the loop 46' positioned in insulation 48 located in the housing 47. When the valve plug 11 is moved to a set position, the groove 44 will establish communication between the pipe 30 and the outlet delivery pipe 49 which serves to conduct the liquid fuel to the engine with which used. As clearly appears in Fig. 4 the inlet delivery pipes 50 and 51 serve to communicate the grooves 52 and 53 formed in the plug or housing 9, with the interior of the containers 13 and 14. Projecting upwardly from the base 8 of these containers adjacent the wall, is a boss 53' in which is formed the passage 54, so that when the plug 11 is turned to establish communication with the delivery pipe, the fuel may be delivered into the interior of the containers between the inner surface thereof and the covering 22. When the plug 11 reaches a certain angle as it switches the flow of gasoline so as to pass from one unit to the other, it becomes a shut-off for both containers 13 and 14, that is, in the intermediary stage when the valve is being turned from a position in which the gasoline may flow from the container 14 to a position in which the gasoline from the container 14 will be shut off and the gasoline may flow from the container 13, the gasoline supply to both of the containers is shut off.

In this way, the fuel will be delivered to the interior of the containers and forced to pass through the filtering members 22 and 35 and the screen 29 before passing outwardly to the engine with which used. Foreign material such as water rubber and abrasives and the like which is customarily found in gasoline and similar combustible fuels will be filtered from the gasoline and may be drained from the containers through the drain pipe.

With a filter of this description, the screen 29 and sheep skins 22 and 35 may be easily and quickly removed from the containers for cleansing. If desired, the supporting member 33 with its cover 35 may also be removed for cleansing by the removal of the outer filtering member which permits the removal and replacement of the filter members while the engine is operating, the provision of dual chambers permitting this as well as the provision of the dual filtering members. This also permits the continuous operation of aviation engines. In case of gasoline exhaustion, the containers 13 and 14 may be drained by removing the sheep-skin elements which would leave the screen 29 to strain the gasoline.

It is preferred that the containers and the covers therefor be formed from metal and in order to prevent sparking when the cover is being placed upon the container, a metallic retainer 98 is used to secure the cover and maintain connections between the cover and the container at all times. The filter may be used with a vehicle which is equipped with a vacuum feed or which is gravity fed.

Having thus described my invention, what I claim as new and desire to secure by Letters Patent is:

A filter of the class described comprising a pair of containers positioned side by side; a filter element in each of said containers, a compartment formed between said containers adjacent the upper end thereof and connecting with each of said containers; a float positioned in said compartment, said compartment having an air relief opening in its upper end and a valve in said compartment engageable with said float upon a rising of the same to a predetermined distance and serving as a closure of said relief opening.

In testimony whereof I have signed the foregoing specification.

LAWRENCE R. LENTZ.